UNITED STATES PATENT OFFICE 2,245,297

REFRACTORY

Norman Percy Pitt and Arthur Clarence Halferdahl, Rockcliffe, Ontario, and Frank Eugene Lathe, Ottawa, Ontario, Canada, assignors, by mesne assignments, to Canadian Refractories Limited, Montreal, Quebec, Canada, a corporation of Canada No Drawing. Application October 19, 1934, Serial No. 749,042

10 Claims. (Cl. 106—9)

This invention relates to stable basic and neutral refractories containing substantial proportions of lime and silica, and in which the lime and silica, or their equivalents, are present in a well defined ratio.

While lime-bearing refractories, such as burned dolomite, are widely used, they are by no means an ideal basic refractory, largely due to the great chemical activity of the contained lime. Such refractories are subject to rapid disintegration, occasioned by absorption of moisture from the atmosphere, and to chemical reaction with slag or the like. Brick formed therefrom are unstable, frequently falling to a powder in a relatively short time. When used in the formation or repair of furnace hearths, in which they come in contact with molten slag, as in open hearth steel furnaces, they are attacked chemically so that they normally require to be replaced after every heat.

Many attempts have been made to improve such refractories. The introduction of iron compounds prior to burning has resulted in a denser product, but without effectively overcoming the difficulties mentioned above. While silica in small amount has invariably been present in burned dolomite, manufacturers of refractories have hitherto hesitated to introduce any considerable quantity of silica since an increase not properly balanced with lime has led to reduced refractoriness, and since such compositions approach more nearly those of metallurgical slags containing silica, which have relatively low melting points.

Applicants, however, have made the discovery that excellent refractories may contain lime and silica in widely varying proportions, provided that the ratio between the basic and acid constituents is maintained within prescribed limits, whereby no chemically active lime remains in the product. It has also been found that in the production of such refractories the use of certain stabilizing agents, which act to promote the clinkering, fritting or catalytic reactions in burning, is important, particularly in producing the required chemical stability in the finished product.

An object of this invention is to provide basic or neutral refractories which may be produced at a fraction of the cost of known products having comparable properties. A further object is to provide lime-bearing products which are highly refractory, and in which the lime has been rendered so inert as to be very resistant to hydration and other chemical attack.

The maintenance of a suitable ratio between the basic and acid constituents, hereafter called the "effective base-acid ratio" is essential. It has been established that, in addition to lime and silica, which constitute the most important factors in the determination of the ratio, other bases and acids should also be taken into consideration. Thus magnesia, when present, has been found to be the equivalent, in effect, of about one-fifteenth of an equal percentage of lime, and the acid constituents, including ferric oxide, chromic oxide, alumina, etc., may for practical purposes be added together and taken as equivalent to one-tenth of an equal percentage of silica. The effective base-acid ratio therefore becomes:

$$\frac{\%CaO + \frac{\%MgO}{15}}{\%SiO_2 + \frac{\%Fe_2O_3 + \%Cr_2O_3 + \%Al_2O_3, \text{etc.}}{10}}$$

This ratio may vary between 1.40 and 3.90, and these limits include all the refractories comprised within the scope of this invention. Even within these limits, however, the use in proper amount of a suitable stabilizing agent or agents is essential to the production of satisfactory refractories.

In accordance with the invention, such basic refractories may contain lime 8 to 76%, with 9 to 40% of silica and have an effective base-acid ratio between 1.40 and 3.90. They also contain a stabilizing agent or agents, the proper selection of which in the manufacture of the refractory insures a low hydration value, which in no case should exceed 7% and which is usually much less. The alumina content should preferably be very low, as it reduces the refractoriness of the product.

A wide selection of raw materials is available for the production of these refractories. The widely distributed dolomites are particularly suitable as a source of lime, but limestone may be employed and, when available, the lime and lime-magnesia silicates, wollastonite, pyroxene and amphibole and the like may be used to supply both lime and silica. Silica may be introduced as sand, sandstone, quartzite, serpentine, slag and the like, but care must be taken that these raw materials are relatively free from active fluxes and particularly alumina. Magnesia may be present in any desired proportion provided that its presence is allowed for in determining the effective base-acid ratio.

As stabilizing dead-burning agents, chromite, apatite, iron ore, manganese ore, millscale, basic open-hearth and converter slags, phosphates, fluorides, borates and the like, or mixtures thereof, may be used. The amount of stabilizing agent may vary widely, according to the nature of the particular agent used and the result desired. Ordinarily the proportion will lie between 1 and 8% on the unburned basis, but these figures do not represent the limit in either direction. Frequently it has been found advantageous to use a mixture of stabilizing agents; for example, iron oxide with chromite or phosphate.

Chromite has been found particularly suitable as a dead-burning agent, as it is very effective in promoting reactions between the constituents, rendering the product chemically stable and preventing the development of hydraulic properties.

In the production of these basic refractories the raw materials are compounded in such a way as to produce the desired composition, with the base-acid ratio within the defined limits. To facilitate the reactions which take place on burning the raw constituents and the stabilizing agents are preferably ground finely and thoroughly mixed before burning. Burning may then be done in a rotary kiln fired with oil or coal, or by any other convenient method. On account of the greater refractoriness of the clinkers, a higher burning temperature than that usually employed is preferred. Some of the clinkers form satisfactorily at 2700 to 2800° F. and others, which are more refractory, at higher temperatures. A number of very refractory clinkers have been formed at 3000 to 3200° F.

The following examples are illustrative of the particular composition of the refractory and of the methods of producing it. The high refractoriness of these products may be judged by the fact that when burned at 3000° F. none of them showed any signs of vitrification, much less of fusion.

| Composition | Effective base | Effective acid | Ratio | Ignition loss after hydration test |
|---|---|---|---|---|
| 82.2% dolomite<br>6.0% chrome ore<br>11.8% sand | 43.25 | 21.40 | 2.02 | 1.0 |
| 70.5% dolomite<br>4.5% chrome ore<br>25.0% serpentine | 37.75 | 18.00 | 2.07 | 1.2 |
| 87.15% dolomite<br>3.5% mill scale<br>9.35% sand | 47.35 | 17.1 | 2.77 | 3.3 |
| 50.3% limestone<br>7.5% chrome ore<br>42.2% serpentine | 46.25 | 23.41 | 1.98 | 0.2 |
| 73.5% limestone<br>7.5% chrome ore<br>19.0% sand | 60.00 | 30.80 | 1.95 | 0.2 |
| 82.2% limestone<br>5.0% mill scale<br>12.8% sand | 67.00 | 25.25 | 2.65 | 2.4 |
| 94.6% magnesitic dolomite<br>2.7% mill scale<br>2.7% sand | 25.20 | 11.25 | 2.24 | 2.2 |
| 88.1% magnesitic dolomite<br>5.0% chrome ore<br>6.9% serpentine | 24.25 | 10.90 | 2.23 | 1.25 |
| 51.7% limestone<br>25.9% dolomite<br>7.5% chrome ore<br>14.9% sand | 56.75 | 25.60 | 2.22 | 0.8 |
| 83.7% dolomite<br>1.0% chrome ore<br>3.0% mill scale<br>12.3% sand | 44.05 | 21.65 | 2.03 | 0.7 |
| 78.15% limestone<br>4.0% calcium phosphate<br>17.85% sand | 64.15 | 31.80 | 2.02 | 0.1 |
| 93.9 magnesitic dolomite<br>3.0% chrome ore<br>3.1% sand | 17.08 | 9.45 | 1.81 | 1.2 |
| 82.5% dolomite<br>0.5% chrome ore<br>17.5% sand | 42.64 | 29.02 | 1.47 | 0.5 |
| 87.7% dolomite<br>5.0% mill scale<br>7.3% sand | 47.83 | 13.94 | 3.43 | 3.6 |
| 66.45% dolomite<br>13.0% slag<br>20.55% serpentine | 42.05 | 16.60 | 2.53 | 3.2 |
| 65.55% limestone<br>23.55% slag<br>10.9% sand | 65.0 | 22.8 | 2.85 | 4.4 |
| 75.8% limestone<br>4.0% chromium oxide<br>20.2% sand | 62.45 | 31.90 | 1.91 | 0.3 |

From what has been said it will be apparent that some of the refractories now in use and containing a substantial proportion of lime, such as some of those made from dolomite, may be greatly improved in resistance to hydration, as well as in refractoriness, by adjusting the balance between basic and acid constituents in the manner indicated. In general, in any refractory body containing an excess of either silica or lime, which is detrimental to that refractory, this excess may be made to combine with either lime or silica, whichever the case may be, and in the presence of a suitable stabilizing agent, so that neither chemically active lime nor chemically active silica exists in the resultant body.

The following examples may be given:

(1) It is well known that many chrome ores contain as an impurity a quantity of silica as serpentine. This silica is detrimental to the refractoriness of the chrome ore. By adding a sufficiency of lime or lime-bearing materials, so that the effective base-acid ratio falls within the limits already defined, an improved refractory results. This principle may also be employed in the manufacture of chrome bricks.

(2) Certain commercial clinkered dolomites are unstable when exposed to atmospheric conditions, due to the presence of a large amount of free and chemically active lime. If, in the process of manufacture, these dolomites are burned with a sufficiency of silica or silica-bearing materials, so that the base-acid ratio falls within the limits already defined, the stability of these dolomites to atmospheric conditions is very materially improved. A further considerable improvement is brought about if a small amount of chrome ore is incorporated into the raw mix before burning.

(3) Silica or silicates are a common binder in many refractory materials, particularly cements. By adding a sufficiency of lime or lime-bearing materials, in the proportions already defined, this undesirable silica may be made to combine with the lime to produce a refractory body, in the presence of a suitable stabilizing agent. Similarly materials containing too much silica to be susceptible of successful treatment by heretofore known methods, such as certain magnesite and hydro-magnesite deposits, may be successfully treated as herein described.

The hydration value of a refractory is an important property of a successful product and in determining this value as indicated above the following procedure was followed. The clinker was pulverized to −100 mesh +150 mesh (screen openings 0.147 and 0.104 mm., respectively). A test portion, usually 10 grams, was placed in a crucible, thoroughly wetted with water, and placed in a steam chest with live steam at 212° F. for 18 hours. Steam was circulated freely throughout the test. The crucible and contents were then dried at 230° F. for 24 hours to remove all moisture and an ignition loss was determined in the customary manner. This ignition loss is the "hydration value" and should not exceed 7%.

It is recognized that hydraulic cements contain lime and silica within the proportions specified, but these cements differ radically in their properties from the products herein described. For example, they depend for their very utility upon the fact that they hydrate readily, and they therefore must not be stabilized chemically in the manner prescribed. Further, the presence in cements of magnesia, which is relatively inert, is regarded as objectionable, while in the products described herein it is made as inert as possible, and its presence is advantageous in producing certain desirable properties. Moreover, high refractoriness in cements would be objectionable, as it would greatly increase the cost of burning and would frequently result in an inferior product, hence alumina and other fluxing agents are deliberately introduced and no effort is made to eliminate eutectics and other constituents of low melting points.

We claim:

1. A burned refractory composition, comprising as basic constituents magnesia and 21–35 per cent of lime, and acid constituents including silica and a small amount of a stabilizing oxide, the basic and acid constituents being in chemically effective base-acid ratio between 2.23 and 2.77, to form calcium silicates of which tri-calcium silicate is predominant, and burned at a temperature rendering the product substantially non-hydrating.

2. A burned refractory composition, comprising as basic constituents magnesia and 35–38 per cent of lime, and acid constituents including silica and a stabilizing oxide, the basic and acid constituents being in chemically effective base-acid ratio between 2.23 and 2.77, to form calcium silicates of which tri-calcium silicate is predominant, and burned at a temperature rendering the product substantially non-hydrating.

3. A burned refractory composition, comprising as basic constituents magnesia and at least 21 per cent of lime, and acid constituents including silica and a stabilizing oxide, the basic and acid constituents being in chemically effective base-acid ratio between 2.23 and 2.77, to form calcium silicates of which tri-calcium silicate is predominant, and burned at a temperature rendering the product substantially non-hydrating.

4. A burned refractory composition, comprising as basic constituents magnesia and at least 21 per cent of lime, and acid constituents including silica and a stabilizing oxide, the basic and acid constituents being in chemically effective base-acid ratio between 2.53 and 2.77, to form calcium silicates of which tri-calcium silicate is predominant, and burned at a temperature rendering the product substantially non-hydrating.

5. A burned refractory composition, comprising as basic constituents magnesia and lime, and acid constituents including silica and a stabilizing oxide, the basic and acid constituents being in chemically effective base-acid ratio between 2.23 and 2.77 with lime at least 21 per cent and between 2.23 and 3.90 where lime is 50–76 per cent, to form calcium silicates of which tri-calcium silicate is predominant, fluxing material being insufficient to interfere with refractory usage, and burned at a temperature rendering the product substantially non-hydrating.

6. In a method of the character described, reacting by burning to a substantially non-hydrating product a mixture containing as basic constituents magnesia and 21–35 per cent of lime, and acid constituents including silica and a stabilizing oxide, the basic and acid constituents being in chemically effective base-acid ratio between 2.23 and 2.77, to form calcium silicates of which tri-calcium silicate is predominant.

7. In a method of the character described, reacting by burning to a substantially non-hydrating product a mixture containing as basic constituents magnesia and 35–38 per cent of lime, and acid constituents including silica and a stabilizing oxide, the basic and acid constituents being in chemically effective base-acid ratio between 2.23 and 2.77, to form calcium silicates of which tri-calcium silicate is predominant.

8. In a method of the character described, reacting by burning to a substantially non-hydrating product a mixture containing as basic constituents magnesia and at least 21 per cent of lime, and acid constituents including silica and a stabilizing oxide, the basic and acid constituents being in chemically effective base-acid ratio between 2.23 and 2.77, to form calcium silicates of which tri-calcium silicate is predominant.

9. In a method of the character described, reacting by burning to a substantially non-hydrating product a mixture containing as basic constituents magnesia and at least 21 per cent of lime, and acid constituents including silica and a stabilizing oxide, the basic and acid constituents being in chemically effective base-acid ratio between 2.53 and 2.77, to form calcium silicates of which tri-calcium silicate is predominant.

10. In a method of the character described, reacting by burning to a substantially non-hydrating product a mixture containing as basic constituents magnesia and lime, and acid constituents including silica and a stabilizing oxide, the basic and acid constituents being in chemically effective base-acid ratio between 2.23 and 2.77 with lime at least 21 per cent and between 2.23 and 3.90 where lime is 50–76 per cent, to form calcium silicates of which tri-calcium silicate is predominant.

NORMAN PERCY PITT,
ARTHUR C. HALFERDAHL.
FRANK EUGENE LATHE.